United States Patent [19]
Blackwell et al.

[11] Patent Number: 5,922,384
[45] Date of Patent: Jul. 13, 1999

[54] AROMATIZATION OF SOLUBLE BEVERAGES

[75] Inventors: Brian Blackwell, Bexleyheath, United Kingdom; Lawrence G. Carns, Plain City, Ohio; Jason Gawronski, Hayes, United Kingdom; Dean Frederick Rushmore, Marysville, Ohio

[73] Assignee: Nestec S.A., Vevey, Switzerland

[21] Appl. No.: 08/796,318

[22] Filed: Feb. 7, 1997

[30] Foreign Application Priority Data

Feb. 12, 1996 [EP] European Pat. Off. ............. 96200327

[51] Int. Cl.$^6$ ..................................................... A23F 5/46
[52] U.S. Cl. .......................... 426/386; 426/312; 426/314; 426/316; 426/595
[58] Field of Search ..................... 426/312, 316, 426/314, 386, 595

[56] References Cited

U.S. PATENT DOCUMENTS

| | | | |
|---|---|---|---|
| 2,801,774 | 8/1957 | Harkess et al. | 222/226 |
| 3,077,405 | 2/1963 | Clinton et al. | 99/71 |
| 3,148,070 | 9/1964 | Mishkin et al. | 99/71 |
| 3,769,032 | 10/1973 | Lubsen et al. | 99/65 |
| 4,355,571 | 10/1982 | Stoeckli et al. | 99/485 |
| 4,379,172 | 4/1983 | Liu | 426/386 |
| 5,182,926 | 2/1993 | Carns et al. | 62/352 |
| 5,236,729 | 8/1993 | Schlecht et al. | 426/386 |
| 5,576,044 | 11/1996 | Chmiel et al. | 426/386 |

OTHER PUBLICATIONS

Sivitz et al., 1979, *Coffee Technology*, AVI Publishing Company, Inc., pp. 452–460.

Clarke et al., 1987, *Coffee*, vol. 2: Technology, Elsevier Appliced Science Publishers Ltd., pp. 218–219.

*Primary Examiner*—Lien Tran
*Attorney, Agent, or Firm*—Pennie & Edmonds LLP

[57] ABSTRACT

A process for incorporating an aroma-containing substrate into a soluble beverage powder in a filling machine in which the soluble beverage powder is filled into containers. The soluble beverage powder is introduced into the filling machine and caused to flow in the form of a moving bed. While in the filling machine and prior to the soluble beverage powder being filled into containers, the aroma-containing substrate is sprayed onto the moving bed. In this way, a mixture of soluble beverage powder and aroma-containing substrate having a substantially constant ratio of aroma-containing substrate to soluble beverage powder, is provided in the containers.

8 Claims, 2 Drawing Sheets

AROMATIZATION OF SOLUBLE BEVERAGES

FIELD OF THE INVENTION

This invention relates to a process for the aromatization of soluble beverage powders; for example soluble coffee powder. The invention also relates to the soluble beverage powders so produced.

BACKGROUND OF THE INVENTION

Consumers associate certain aromas with certain products. If the product lacks the aroma associated with it, consumer perception of the product is adversely affected. This is particularly a problem in the field of soluble beverages such as soluble coffee powder, although it also exists in other fields. For ease of description, the problem is described in this specification primarily with reference to soluble coffee powder, although the invention is not limited to this application.

Soluble coffee powders which are obtained from commercial processes involving extraction, concentration and drying, are usually substantially aroma-less. For this reason, it is conventional to trap coffee aromas which are given off during the processing of the soluble coffee powder and to reincorporate these aromas into the soluble coffee powder.

Usually the aroma is reincorporated by first capturing the aroma into a substrate such as an oil or emulsion. The aroma-containing substrate is then usually sprayed on the soluble coffee powder prior to handling and blending. The blended coffee powders are later filled into jars which are then sealed.

A typical procedure by which an aroma-containing substrate is sprayed on soluble coffee powder is described in U.S. Pat. No. 3,148,070 (Mishkin) and Sivetz, M. and Desrosier, N. W.; 1979; *Coffee Technology*, AVI Publishing Company, Inc.; Westport, Conn.; pages 459 and 460. In this procedure, soluble coffee powder falls down a supply tube and onto a conical distributor which causes the soluble coffee powder to continue its fall in the form of a tubular curtain. A spray nozzle is positioned beneath the conical distributor, within the tubular curtain, to spray an aroma-containing substrate on the inner surfaces of the tubular curtain. The tubular curtain of soluble coffee powder then drops into a blender where it is mixed to homogeneously distribute the aroma-containing substrate throughout the soluble coffee powder. The aromatized soluble coffee powder is then fed into a filler machine in which it is fed into jars or other containers.

In variations of this theme, the aroma-containing substrate is sprayed on falling sheet-like curtains of soluble coffee powder or is sprayed on soluble coffee powder in tumblers, or is sprayed on soluble coffee powders transported on conveyors. In all cases, the soluble coffee powder is then run through a blender or mixer to have the aroma-containing substrate blended homogeneously throughout the soluble coffee powder.

Although this basic procedure works well, significant amounts of aroma are lost during mixing or blending of the soluble coffee powder after spraying. Further, aroma is lost during the period between spraying and filling of the coffee into containers. Aroma is an expensive component and these losses can significantly increase costs.

One attempt to solve the problem is described in U.S. Pat. No. 3,769,032 (Lubsen). Here coffee jars, which have already been filled with soluble coffee powder, are transported to beneath a mechanical syringe which contains coffee aroma. The syringe descends into each jar until the needle tip is near the bottom of the jar. The syringe then rises and at the same time injects droplets of coffee aroma into the coffee product in the jar. The droplets have a size of about 0.5 mm to 3 mm. Although the results reported in the patent indicate good reincorporation of the coffee aroma, the system would not be not feasible in a high-speed production line. Also, the aroma-containing substrate is not distributed homogeneously throughout the soluble coffee powder in the jar. This is significant draw-back.

Another attempt is disclosed in U.S. Pat. No. 4,355,571 (Stoeckli). This patent discloses the use of an aromatizing apparatus in which an aroma-containing substrate is plated on soluble coffee powder. A small portion of the soluble coffee powder is directed to the aromatizing apparatus and falls down a chute onto a rotating wheel. The wheel has several circumferential grooves in its surface into which the soluble coffee powder is pressed. The soluble coffee powder is rotated with the wheel through an arc of about 90° after which it is expelled from the wheel. Needles are positioned immediately after the point of expulsion to inject a stream of an aroma-containing substrate on the soluble coffee powder expelled from the wheel. The aromatized soluble coffee powder is then returned to the major portion of the soluble coffee powder and blended in with the major portion. The blend is then fed to a filler machine in the usual manner.

Although the process described in this patent does not require spraying of the aroma-containing substrate, it does require blending after addition of the aroma-containing substrate. Due to the volatile nature of aroma, significant aroma losses still occur during blending and during the period between blending and filling of the coffee into containers.

Therefore there is still a need for a process of incorporating an aroma-containing substrate into soluble beverage powder which results in relatively low losses of aroma.

SUMMARY OF THE INVENTION

Accordingly, this invention provides a process for incorporating an aroma-containing substrate into a soluble beverage powder, the process comprising:

introducing the soluble beverage powder into a filling machine in which the soluble beverage powder is filled into containers;

causing the soluble beverage powder to flow in the form of a moving bed in the filling machine; and spraying the aroma-containing substrate onto the moving bed of soluble beverage powder in the filling machine prior to the soluble beverage powder being filled into containers for providing a mixture of soluble beverage powder and aroma-containing substrate in the containers having a substantially constant ratio of aroma-containing substrate to soluble beverage powder.

It has been surprisingly discovered that it is possible to incorporate an aroma-containing substrate into soluble beverage powder in a filling machine such that a substantially constant ratio of aroma-containing substrate to soluble beverage powder is obtained. Previously, it had always been thought that the aromatized soluble beverage powder needed to be mixed or blended to obtain homogeneity between containers. It is also found that the process provides the advantage of significantly reduced aroma loss; for example it is found that up to about half the amount of aroma previously required is now needed to obtain the same aroma strength. Further, it is found that the aromatized soluble beverage powder has improved aroma characteristics.

Preferably the process includes the step of determining the amount of soluble beverage powder entering or leaving the filling machine. If this amount changes, the process includes the step of adjusting the amount of aroma-containing substrate sprayed onto the soluble beverage powder to obtain a substantially constant ratio of aroma-containing substrate and soluble beverage powder.

Preferably the aroma-containing substrate is sprayed evenly onto an upper surface of the moving bed of the soluble beverage powder for obtaining a substantially homogeneous mixture of soluble beverage powder and aroma-containing substrate in the containers. Preferably furrows are formed into the upper surface of the moving bed prior to spraying of the aroma-containing substrate onto the moving bed.

The moving sheet of soluble beverage powder may be formed on a rotating filling plate in the filling machine. Preferably, substantially all the soluble beverage powder on the rotating filling plate is caused to flow into the containers without recirculation. This may be achieved by controlling the amount of soluble beverage powder on the rotating filling plate.

Preferably the process further comprises determining the thickness of the moving bed on the rotating filling plate and controlling the rate at which the soluble beverage powder is introduced into the filling machine to keep the thickness below a level at which recirculation occurs but sufficient to fill the containers. The thickness of the moving bed is preferably maintained between about 5 mm and about 75 mm.

The soluble beverage powder is preferably soluble coffee powder and the aroma-containing substrate is preferably an aromatized coffee oil. Preferably the aromatized coffee oil contains less than 4% moisture by weight.

The invention also provides an aromatized soluble beverage powder produced by a process as defined above.

BRIEF DESCRIPTION OF THE DRAWINGS

Embodiments of the invention are now described, by way of example only, with reference to the drawings in which.

DETAILED DESCRIPTION OF PREFERRED EMBODIMENTS OF THE INVENTION

The process requires a soluble beverage powder to be aromatized in a filling machine by the spraying of an aromatized substrate onto the soluble beverage powder prior to soluble beverage powder being filled into containers. It will be appreciated that the process is applicable to many types of soluble beverage powders; for example soluble coffee powders; powders formed of mixtures of soluble coffee, whiteners and sweeteners; soluble tea powders; soluble chocolate powders; and the like. However, for simplicity, the process will be described in detail only with respect to soluble coffee powder. The soluble coffee powder may be obtained from a suitable extraction, concentration and drying process. Suitable extraction, concentration and drying processes are well known and examples are described in Sivetz (1979). Freeze dried and spray dried powders may be used. The powders may be agglomerated prior to aromatisation but need not be.

For coffee applications, the aromatized substrate is suitably a coffee oil or an emulsion of a coffee oil and water or coffee extract. However coffee oil which contains as little moisture as possible is preferred; for example less than 4% moisture by weight. The coffee oil which is used may be any desired coffee oil; for example coffee oil obtained from commercial sources or produced by extracting it from spent coffee grounds and the like using procedures which are well known in the art. For example, the coffee oil may be expelled from freshly roasted coffee beans using commercially available oil expellers. This technique and other suitable techniques for extracting coffee oil from coffee beans, are described in Sivetz (1979); pages 452 to 460. The source and the exact composition of the coffee oil used is not critical. Other edible oils may be used in full or partial replacement of coffee oil but this is not preferred for coffee applications; particularly if the resulting product is to be considered pure coffee. However for mixtures or other products, other oils (such as rapeseed oil) may be preferable.

For coffee applications, the aroma carried by the substrate is preferably coffee aroma. Conveniently, the coffee aroma is made up of natural coffee aroma gases. The coffee aroma gases may be collected at any of several points in the processing of coffee, for example gases evolved during roasting of green coffee ("roaster gases"), gases evolved during grinding of roasted whole beans ("grinder gases") and those evolved during infusion of ground roasted coffee ("infusion gases"). Preferably, the coffee aroma is used in the form of a cryogenically condensed, aroma frost which may be produced as described in U.S. Pat. No. 5,182,926; the disclosure of which is incorporated by reference. Of course, synthetic coffee aromas may also be used. Also, other desired aromas, for example vanilla, almond, chocolate, whisky, brandy, Irish creme, etc. may be used or included.

Figure 1:
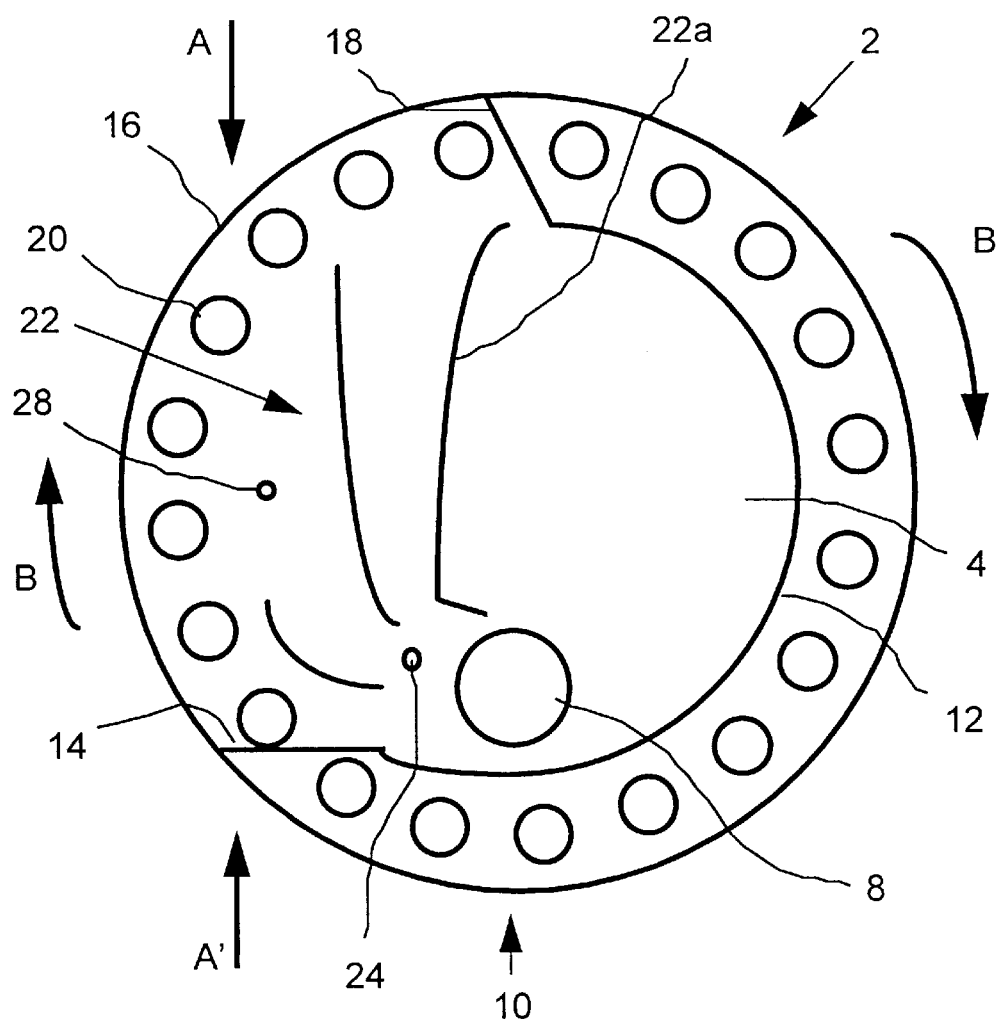
FIG. 1 is a schematic top view of the interior of a powder filling machine.
Figure 2:
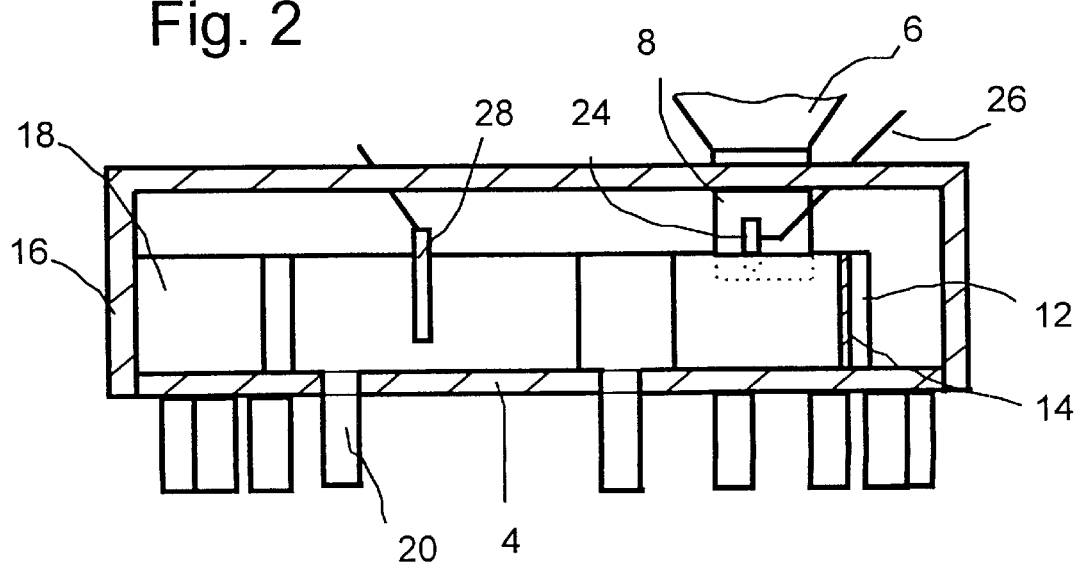
FIG. 2 is a cross-section along line A-A' of FIG. 1.

The filling machine which is used may be any suitable filling machine which permits an aromatized substrate to be sprayed on the powder in the machine. For example, the process may be applied in a powder filling machine 2 which has a flat, circular, rotary filler plate 4 as is illustrated in FIGS. 1 and 2. Suitable filling machines of this type are the Necoflo (trade name) series of filling machines supplied by John R. Nalbach Engineering Co, Inc.; of Chicago, Ill., USA.

Coffee powder is fed into the machine 2 through a hopper 6, into an inlet sleeve 8, and onto the filler plate 4. The height of the lower end of the inlet sleeve 8 above the filler plate 4 is adjustable such that the level of powder on the filler plate 4 may be controlled. Suitable hydraulic or pneumatic drives (not shown) are connected to the inlet sleeve 8 to enable adjustment of its vertical position. The inlet sleeve 8 is positioned eccentrically with respect to the filler plate 4; adjacent an inlet end 10 of the machine 2. In use, the filler plate 4 rotates in the direction of the arrows B.

A semi-cylindrical, primary baffle 12 is positioned on the filler plate 4 to partially surround the inlet sleeve 8. The primary baffle 12 extends from a position a little downstream (in the direction of rotation of the filler plate 4) of the inlet sleeve 8 through an angle of about 240° to about 270° in a direction against the rotation of the filler plate 4. An inlet end plate 14 connects the inlet end of the primary baffle 12 to the side 16 of the machine 2 while a cut-off end plate 18 connects the other end of the primary baffle 12 to the side 16 of the machine 2. The filler plate 4 slidingly engages the lower end of the primary baffle 12 so that the filler plate 4 is able to rotate but powder is prevented from moving radially outwardly beyond the primary baffle 12. A window of about 90° to 120° is provided between the inlet end plate 14 and the cut-off end plate 18 in which powder may travel outwardly to the side 16 of the machine 2.

Fill tubes 20 depend from the filler plate 4 at a position inwardly from the outer edge of the filler plate 4. The distance between the fill tubes 20 and the outer edge of the filler plate 4 is less than the distance between the outer edge of the filler plate 4 and the primary baffle 12. In this way, at any point in time, the fill tubes 20 in the window between the inlet end plate 14 and the cut-off end plate 18 are exposed to powder on the filler plate 4. However the remaining fill tubes 20 are hidden from the powder on the filler plate 4 by the primary baffle 12. Powder on the filler plate 4 in the window is able to drop through the fill tubes 20 and into containers (not shown) telescopically fitted about the lower ends of the fill tubes 20.

Flow baffles 22 extend from a position near the inlet sleeve 8 outwardly towards the outer edge of the filler plate 4. For simplicity, three flow baffles 22 are shown but the machine 2 may have more (or less). The filler plate 4 slidingly engages the lower end of the flow baffles 22 so that the filler plate 4 is able to rotate but powder is prevented from moving under the flow baffles 22. In this way, powder falling onto the filler plate 4 is directed in several flow streams towards the outer edge of the filler plate 4 and into the fill tubes 20 in the window.

A spray nozzle 24 is positioned above the filler plate 4, a little down-stream from the inlet sleeve 8 but prior to the flow baffles 22. The spray nozzle 24 may be any suitable nozzle which is able to break up a aromatized substrate into droplets and spray the droplets into a suitable pattern; for example a conical pattern. A two fluid nozzle is particularly suitable. Suitable nozzles are commercially available and may be obtained, for example, from Spray Systems. The aromatized substrate is fed to the spray nozzle 24, through a feed line 26, using a pump (not shown). The pump preferably is able to continuously supply the aromatized substrate. Gear pumps, such as the Zenith (trade name) pumps obtainable from Parker Hannifin Corporation of Sanford, N.C., USA, are particularly suitable. However suitable centrifugal pumps or batteries of reciprocating pumps may also be used. It is preferred if the amount of aromatized substrate supplied may be accurately controlled. If desired, the spray nozzle 24 may include suitable cleaning devices which are activated if the spray nozzle 24 becomes blocked. A suitable cut-off-valve may be positioned between the pump and the spray nozzle 24 to prevent dripping when the pump is deactivated.

A level sensor 28 is positioned above the filler plate 4, down-stream from the spray nozzle 24, but within the window between the inlet end plate 14 and the cut-off end plate 18. The level sensor 28 determines the height of powder on the filler plate 4 and transmits an appropriate signal to a microcontroller (not shown). The microcontroller, in turn, controls the drives which adjust the height of the inlet sleeve 8 above the filler plate 4.

The microcontroller is also connected to a sensor (not shown) which determines the number of containers entering the machine 2. In this way, an accurate determination of the amount of coffee powder leaving the machine may be made. On the basis of this determination, the microcontroller controls the pump supplying the aromatized substrate to obtain the correct ratio of aromatized substrate to powder in the containers. Suitable microcontrollers are commercially available and may be obtained, for example, from the Allen-Bradley company.

In use, powder in the hopper 6 falls through the inlet sleeve 8 onto the filler plate 4. The rotation of the filler plate 4 transports the powder away from beneath the inlet sleeve 8 and towards the outer edges of the filler plate 4. As the powder passes beneath the spray nozzle 24, it receives a coating of aromatized substrate. The powder is then separated into streams by the flow baffles 22 and continues travelling outwardly. As the powder reaches the openings to the fill tubes 20, it falls down the fill tubes 20 and into the containers fitted telescopically about the fill tubes 20.

Ordinarily, powder which reaches the cut-off end plate 18 without having fallen down a fill tube 20 would be directed inwardly by the cut-off end plate 18 so that it would travel with the filler plate 4, inwardly of the primary baffle 12. After circulating behind the inlet sleeve 8, it would again pass under the inlet sleeve 8 and proceed as before. However this is undesirable since this powder would have already been coated with carrier substance. Consequently pockets of powder which contains more carrier substance than the remainder of the powder would develop. These pockets would cause non-homogeneity in the containers that they fall into. This problem may become severe if the same pocket of powder recirculates a number of times.

Therefore, the amount of powder fed onto the filler plate 4 is controlled such that the little or no powder cycles behind the inlet sleeve 8. This is achieved by monitoring the height of the powder on the filler plate 4 using the level sensor 28. If the height of powder reaches a level at which recirculation becomes likely, the height of the inlet sleeve 8 above the filler plate 4 is reduced to reduce the amount of powder flowing into the machine 2. However, if the height of the powder reduces to a level which is a minimum to ensure proper filling of all containers attached to the fill tubes 20, the inlet sleeve 8 is raised. Also, the downstream-most flow baffle 22a prevents flow of powder behind the inlet sleeve 8. In general, the height of the powder on the filler plate 4 is in the range of about 5 mm to about 75 mm; more preferably about 10 mm to about 30 mm.

The powder in the containers leaving the machine 2 contains a substantially homogeneous mix of powder and aromatized substrate and with the correct amount of aromatized substrate. In certain cases, it is found that homogeneity may be improved by incorporating a raking device (not shown) between the inlet sleeve 8 and the spray nozzle 24. The raking device has the effect of creating furrows in the powder on the filler plate 4; hence increasing the surface area which may be coated by the aromatized substrate. Suitable static mixing devices may also be positioned between the flow baffles 22 to obtain better mixing of the aromatized powder.

It will be appreciated that the process may be applied in any suitable filling machine. For example, in the Necoflo G5 (trade name) machine supplied by John R. Nalbach Engineering Company, Inc., a volume control gate is used to control the level of powder on the filler plate and to obtain fine control of the amount of powder filled into the containers. In this configuration, the level sensor 28 may be positioned immediately in front of the volume control gate to ensure that just enough powder is on the filler plate to enable the volume control gate to operate adequately. However the amount of powder is such that recirculation is minimised or prevented entirely.

The process may also be used in machines in which the filler plate is replaced by a rotating conical surface; the fill tubes being located at the base of the conical surface. In this case, the aromatized substrate may be sprayed onto the powder after the powder has been dropped onto the conical surface.

The containers into which the soluble beverage powder is filled may be any suitable containers; for example glass jars, tin cans, sachets, and the like. It will be appreciated that in small containers such as small sachets, it is not necessary to obtain substantial homogeneity within each container. However each sachet should contain substantially the same amount of aromatized substrate.

EXAMPLE 1

A Necoflo filling machine obtained from John R. Nalbach Engineering Company, Inc. is operated to receive and fill 90 glass jars of 300 g capacity per minute. About 27000 g/minute of soluble coffee powder is fed into the filling machine to fall onto the rotating filling plate. About 80 g/minute of aromatized coffee oil is sprayed onto the coffee powder on the rotating filling plate through a two fluid nozzle. This provides a concentration of coffee oil in the soluble coffee powder of about 0.3%. A gear pump is used to continuously supply the aromatized coffee oil to the spray nozzle. The height of the soluble coffee powder on the rotating filling plate is monitored and maintained by controlling the height of the inlet sleeve such that no recirculation of powder takes place. The filling machine is run for three days under normal processing conditions without problem.

Jars are selected randomly throughout the trial period and analysed for homogeneity. No difference between the jars is detectable. The soluble coffee in each jar is separated into six layers and the concentration of aromatized coffee oil determined. Differences in coffee oil concentration between the layers in each jar are small and well within acceptable limits. The mixture of soluble coffee powder and aromatized coffee oil may be considered substantially homogeneous.

Figure 3:
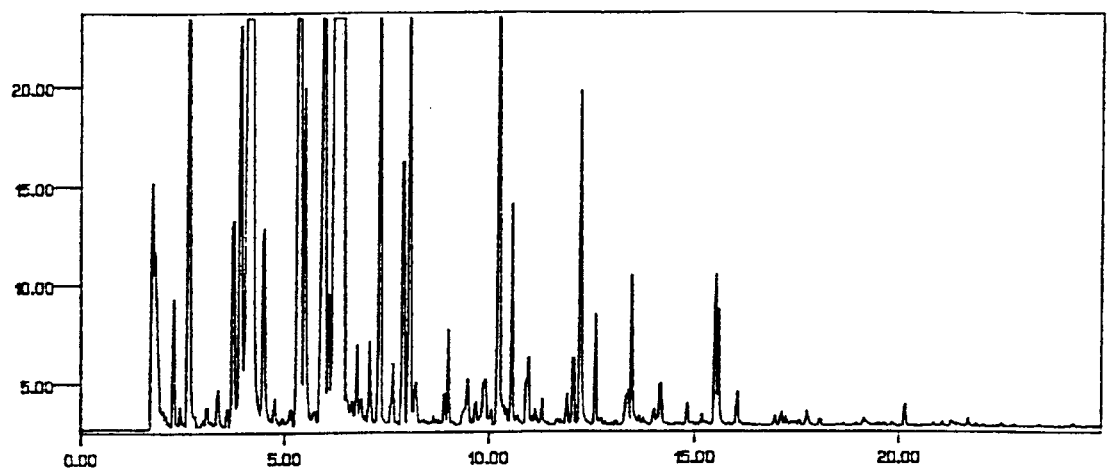
FIG. 3 is a gas chromatogram of a soluble coffee powder produced by the process of the invention.

Upon opening, certain of the jars are sniffed by a panel of experts and perceived to have a sweet and fresh aroma. The headspace above each jar is subjected to G.C. analysis and a typical chromatogram is given in FIG. 3.

EXAMPLE 2

By way of comparison, an aromatized soluble coffee product is prepared in the convention manner. The concentration of coffee oil in the aromatized soluble coffee product is 0.3%; the same as that of the aromatized soluble coffee powder produced according to Example 1.

Figure 4:
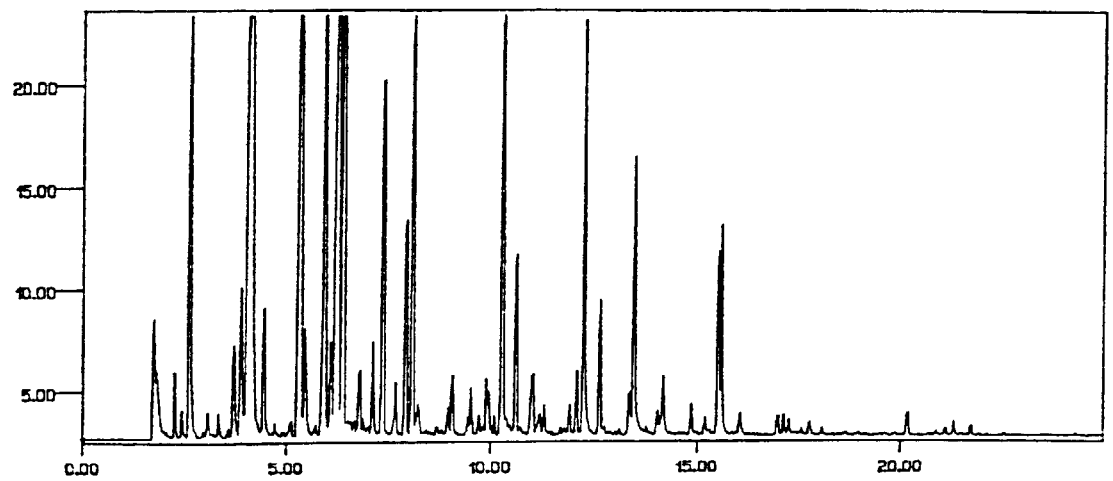
FIG. 4 is a gas chromatogram of a soluble coffee powder produced by a conventional process.

Certain of the jars are opened and sniffed by a panel of experts. The coffee is perceived to have a grassy and harsher, less fresh aroma that the aromatized soluble coffee powder produced according to Example 1. The headspace above each jar is subjected to G.C. analysis and a typical chromatogram is given in FIG. 4. The total area under the curve is just over half that of the aromatized soluble coffee powder produced according to Example 1. Also certain peaks are missing indicating that certain aroma components are not present.

EXAMPLE 3

A Jones filling machine is operated to create and fill 800 sachets of 12 g capacity per minute. About 9600 g/minute of soluble powder mixture made up of 48.3% sugar, 36.7% creamer and 15% coffee is fed into the filling machine. About 23.6 g/minute of aromatized rapeseed oil is sprayed onto the powder through a two fluid nozzle. The aromatized oil is continuously fed to the spray nozzle from an elevated oil reservoir. Flow rate is controlled using a needle valve. The filling machine is run for 1 hour under normal processing conditions without problem.

Certain of the sachets are opened and perceived to have a sweet and fresh aroma.

EXAMPLE 4

The procedure of example 1 is repeated except that the amount of coffee oil used is reduced so that concentration of coffee oil in the aromatized soluble coffee product is about 0.2%. Certain of the jars are sniffed by a panel of experts and perceived to have a sweet, fresh aroma of excellent intensity.

We claim:

1. A process for incorporating an aroma-containing substrate into a soluble beverage powder, the process comprising:

introducing the soluble beverage powder into a filling machine in which the soluble beverage powder is filled into containers;

causing the soluble beverage powder to flow in the form of a moving bed in the filling machine;

spraying the aroma-containing substrate onto the moving bed of soluble beverage powder in the filling machine prior to the soluble beverage powder being filled into containers; and determining the amount of soluble beverage powder entering or leaving the filling machine and, if this amount changes, adjusting the amount of aroma-containing substrate sprayed onto the soluble beverage powder for providing a mixture of soluble beverage powder and aroma-containing substrate in the containers having a substantially constant ratio of aroma-containing substrate to soluble beverage powder.

2. A process according to claim 1, in which the aroma-containing substrate is sprayed evenly onto an upper surface of the moving bed of the soluble beverage powder for obtaining a substantially homogeneous mixture of soluble beverage powder and aroma-containing substrate in the containers.

3. A process according to claim 2 in which furrows are formed into the upper surface of the moving bed prior to spraying of the aroma-containing substrate onto the moving bed.

4. A process according to claim 1 in which the moving bed of soluble beverage powder is formed on a rotating filling plate in the filling machine.

5. A process according to claim 4 in which substantially all of the soluble beverage powder on the rotating filling plate is caused to flow into the containers without recirculation.

6. A process according to claim 5 further comprising determining the thickness of the moving bed on the rotating filling plate and controlling the rate at which the soluble beverage powder is introduced into the filling machine to keep the thickness below a level at which recirculation occurs but sufficient to fill the containers.

7. A process according to claim 1 in which the soluble beverage powder is soluble coffee powder and the aroma-containing substrate is an aromatized coffee oil.

8. A process according to claim 7 in which the aromatized coffee oil contains less than 4% moisture by weight.

* * * * *